US009365697B2

(12) United States Patent
Henze et al.

(10) Patent No.: US 9,365,697 B2
(45) Date of Patent: Jun. 14, 2016

(54) FLAME-RETARDANT THERMOPLASTIC POLYURETHANE BASED ON METAL HYDROXIDES AND POLYESTEROLS

(71) Applicant: BASF SE, Ludwigshafen (DE)

(72) Inventors: Oliver Steffen Henze, Lemfoerde (DE); Oliver Muehren, Bramsche (DE); Alfons Bertels, Diepholz (DE); Sabine Conrad, Diepholz (DE)

(73) Assignee: BASF SE, Ludwigshafen (DE)

(*) Notice: Subject to any disclaimer, the term of this patent is extended or adjusted under 35 U.S.C. 154(b) by 0 days.

(21) Appl. No.: 14/404,786

(22) PCT Filed: Jul. 26, 2013

(86) PCT No.: PCT/EP2013/065791
§ 371 (c)(1),
(2) Date: Dec. 1, 2014

(87) PCT Pub. No.: WO2014/016406
PCT Pub. Date: Jan. 30, 2014

(65) Prior Publication Data
US 2015/0166769 A1 Jun. 18, 2015

(30) Foreign Application Priority Data
Jul. 27, 2012 (EP) .................... 12178239

(51) Int. Cl.
*C08K 5/523* (2006.01)
*C09K 21/12* (2006.01)
*C08L 75/04* (2006.01)
*C08L 75/06* (2006.01)
*C08K 3/22* (2006.01)
*C08K 9/04* (2006.01)
*C08K 9/10* (2006.01)

(52) U.S. Cl.
CPC . *C08K 5/523* (2013.01); *C08K 3/22* (2013.01); *C08K 9/04* (2013.01); *C08K 9/10* (2013.01); *C08L 75/04* (2013.01); *C08L 75/06* (2013.01); *C09K 21/12* (2013.01); C08K 2003/2227 (2013.01)

(58) Field of Classification Search
CPC ...................................... C08K 5/523
USPC ....................................... 524/141
See application file for complete search history.

(56) References Cited

U.S. PATENT DOCUMENTS

| | | | |
|---|---|---|---|
| 6,043,313 A | 3/2000 | Brink et al. | |
| 6,395,823 B1 | 5/2002 | Brink et al. | |
| 2003/0166749 A1* | 9/2003 | Eckstein ............ | C08G 18/0895 524/101 |
| 2005/0288402 A1* | 12/2005 | Kosaka ............... | C08K 5/0066 524/90 |
| 2006/0155035 A1* | 7/2006 | Metzemacher ........ | B82Y 30/00 524/445 |
| 2010/0324183 A1 | 12/2010 | Henze et al. | |
| 2011/0130491 A1* | 6/2011 | Fukushima .......... | C08K 5/0066 524/100 |
| 2011/0269880 A1 | 11/2011 | Pfaendner et al. | |
| 2012/0202061 A1 | 8/2012 | Lu et al. | |
| 2013/0165558 A1 | 6/2013 | Pfaendner et al. | |
| 2013/0177771 A1 | 7/2013 | Chen et al. | |
| 2013/0245169 A1 | 9/2013 | Henze et al. | |
| 2013/0245170 A1 | 9/2013 | Henze et al. | |

FOREIGN PATENT DOCUMENTS

| | | |
|---|---|---|
| DE | 101 03 424 A1 | 8/2002 |
| DE | 103 43 121 A1 | 4/2005 |
| EP | 0 389 768 A2 | 10/1990 |
| EP | 0 617 079 A2 | 9/1994 |
| EP | 0 922 552 A1 | 6/1999 |
| EP | 1 167 429 A1 | 1/2002 |
| EP | 1 491 580 A1 | 12/2004 |
| EP | 2 374 843 A1 | 10/2011 |
| WO | WO 03/066723 A2 | 8/2003 |
| WO | WO 2006/072461 A1 | 7/2006 |
| WO | WO 2006/121549 A1 | 11/2006 |
| WO | WO 2010/069835 A1 | 6/2010 |
| WO | WO 2010/148574 A1 | 12/2010 |
| WO | WO 2011/050520 A1 | 5/2011 |
| WO | WO 2011/147068 A1 | 12/2011 |
| WO | WO 2011/150567 A1 | 12/2011 |
| WO | WO 2013/135547 A1 | 9/2013 |
| WO | WO 2013/135680 A1 | 9/2013 |
| WO | WO 2013/190118 A1 | 12/2013 |

OTHER PUBLICATIONS

U.S. Appl. No. 14/410,415, filed Dec. 12, 2014, Henze, et al.
International Search Report issued Sep. 2, 2013 in PCT/EP2013/065791.
International Preliminary Report on Patentability issued Jan. 29, 2015 in PCT/EP2013/065791.
D. K. Chattopadhyay, et al., "Structural engineering of polyurethane coatings for high performance applications" Progress in Polymer Science, vol. 32, No. 3, XP005911233, 2007, pp. 352-418.
Prof. Dr.-Ing. E. h. Dr. Richard Vieweg, et al., "Polyurethane: Preparation, properties, processing and application" Kunststoff-Handbuch, Band VII, 1966,12 pages.
Roger N. Rothon, "Surface Modification and Surface Modifiers" Particulate-Filled Polymer Composites, 2003, pp. 153-206.
R. V. Petrella, "The Assessment of Full-Scale Fire Hazards from Cone Calorimeter Data" Journal of Fire Sciences, vol. 12, 1994, p. 14-43.

* cited by examiner

Primary Examiner — Doris Lee
(74) Attorney, Agent, or Firm — Oblon, McClelland, Maier & Neustadt, L.L.P.

(57) ABSTRACT

The present invention relates to compositions comprising at least one thermoplastic polyurethane, at least one metal hydroxide, and at least one phosphorus-containing flame retardant, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC. The present invention further relates to the use of compositions of this type for producing cable sheathing.

13 Claims, 3 Drawing Sheets

FLAME-RETARDANT THERMOPLASTIC POLYURETHANE BASED ON METAL HYDROXIDES AND POLYESTEROLS

The present invention relates to compositions comprising at least one thermoplastic polyurethane, at least one metal hydroxide, and at least one phosphorus-containing flame retardant, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC.

Flame-retardant thermoplastic polyurethanes have been known for a long time. Many applications require the addition of flame retardants. Flame retardants admixed with the thermoplastic polyurethanes (TPUs) here can be either halogen-containing or else halogen-free. An advantage of the thermoplastic polyurethanes rendered flame-retardant by a halogen-free route is generally that on combustion they generate less toxic and less corrosive smoke. Halogen-free flame-retardant TPUs are described by way of example in EP 0 617 079 A2, WO 2006/121549 A1, or WO 03/066723 A2.

Halogen-free flame retardancy can be provided to thermoplastic polyurethanes by using nitrogen-containing and/or phosphorus-containing flame retardants, disclosed by way of example in EP 0 617 079 A2, WO 2006/121549 A1, or WO 03/066723 A2. WO 2006/121549 A1 discloses by way of example flame-retardant thermoplastic polyurethanes which comprise phosphorus compounds as flame retardants. Suitable thermoplastic polyurethanes mentioned include those that are produced with the use of polyesters, of polyethers, or of polycarbonates, or of a mixture thereof. Suitable polycarbonates are likewise disclosed. The sole use of phosphorus-containing flame retardants is often insufficient to ensure adequate flame retardancy. The use of nitrogen-containing flame retardants alone or in combination with phosphorus-containing flame retardants, in contrast, is shown by the prior art to give thermoplastic polyurethanes with good flame retardancy, but also has the disadvantage that the nitrogen-containing compounds can also cause release of toxic fire gases, such as HCN or nitrogen oxides.

Halogen-free flame retardancy can also be provided to thermoplastic polyurethanes by using metal hydroxides alone or in combination with phosphorus-containing flame retardants and/or with phyllosilicates.

EP 1 167 429 A1 also relates to flame-retardant thermoplastic polyurethanes for cable sheathing. The compositions comprise a polyurethane, preferably a polyether-based polyurethane, aluminum hydroxide or magnesium hydroxide, and phosphoric ester.

EP 1 491 580 A1 also discloses flame-retardant thermoplastic polyurethanes for cable sheathing. The compositions comprise a polyurethane, in particular a polyether, aluminum hydroxide or magnesium hydroxide, phosphoric ester, and also phyllosilicates, such as bentonite.

EP 2 374 843 A1 discloses by way of example flame-retardant thermoplastic polyurethanes in particular based on polyethers for cable sheathing with good aging resistance. The compositions comprise a polyurethane and an inorganic oxide. Flame retardants mentioned comprise aluminum hydroxide or magnesium hydroxide, phosphoric ester, phyllosilicates, and mixtures thereof.

DE 103 43 121 A1 discloses flame-retardant thermoplastic polyurethanes which comprise a metal hydroxide, in particular aluminum hydroxide and/or magnesium hydroxide. The thermoplastic polyurethanes are characterized by their molecular weight. The compositions can moreover comprise phosphates or phosphonates. In relation to the starting materials for the synthesis of the thermoplastic polyurethanes, compounds that are disclosed and are reactive toward isocyanates are not only polyesterols and polyetherols but also polycarbonatediols, preference being given here to polyether polyols. There are no examples mentioned for polycarbonatediols. In DE 103 43 121 A1, it is also possible to use, instead of one polyol, mixtures of various polyols. High fill levels are moreover disclosed, i.e. high proportions of metal hydroxides and of other solid components in the thermoplastic polyurethane, where these lead to impairment of mechanical properties.

WO 2011/050520 A1 also discloses flame-retardant thermoplastic polyurethanes, where these comprise a metal hydrate and a specific phosphorus compound as flame retardant. Suitable metal hydrates mentioned are aluminum hydroxide and/or magnesium hydroxide. Other suitable thermoplastic polyurethanes mentioned in WO 2011/050520 A1 are thermoplastic polyurethanes based on polyesters, but the thermoplastic polyurethanes based on polyesterdiols are mentioned only in general terms here, and no examples are mentioned. WO 2011/147068 A1 and WO 2011/150567 A1 likewise relate to flame-retardant thermoplastic polyurethanes.

A disadvantage of mixtures based on thermoplastic polyurethanes in combination with metal hydroxides is low aging resistance, which makes these materials unsuitable for many application sectors. EP 2 374 843 A1, by way of example, adds sparingly soluble oxides of di- and tri-valent metals in order to improve aging resistance. However, the addition of other solids impairs the mechanical properties of the thermoplastic polyurethanes.

It was therefore an object of the present invention, starting from the prior art, to provide flame-retardant thermoplastic polyurethanes which have good aging resistance and exhibit good flame retardancy properties.

The invention achieves said object via a composition comprising at least one thermoplastic polyurethane, at least one metal hydroxide, and at least one phosphorus-containing flame retardant, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC.

The compositions of the invention comprise at least one thermoplastic polyurethane based on at least one diisocyanate and on at least one polyesterol, and also at least one metal hydroxide, and at least one phosphorus-containing flame retardant. The weight-average molar mass of this thermoplastic polyurethane in the composition of the invention is in the range from 50 000 g/mol to 200 000 g/mol, measured by means of GPC.

The molar mass of the thermoplastic polyurethanes is determined here for the purposes of the present invention by means of GPC. The molar mass is determined as in example 1 (two GPC columns arranged in series: PSS gel; 100 A; 5µ; 300*8 mm, Jordi DVB gel; mixed bed; 5µ; 250*10 mm; column temperature 60° C.; flow rate 1 mL/min; RI detector). Polymethyl methacrylate (EasyCal; PSS, Mainz) is used for calibration here, and dimethylformamide is used as eluent.

Surprisingly, it has been found that the compositions of the invention have better properties than the compositions known from the prior art, for example improved aging resistance. Furthermore, the compositions of the invention have good properties in relation to smoke densities, and also have good flame retardancy. The mechanical properties of the compositions of the invention are likewise good. An example of a measure of the mechanical properties is the tensile strength or the tensile strain at break of the moldings produced from the compositions of the invention, prior to aging. Tensile strength is determined in accordance with DIN 53504.

It has been found that the mechanical properties of a comparable composition comprising a thermoplastic polyurethane with weight-average molar mass below 50 000 g/mol, measured by means of GPC, are inadequate for many applications. Comparable compositions comprising a thermoplastic polyurethane with weight-average molar mass above 200 000 g/mol, measured by means of GPC, have poor processability, again making these unsuitable for most applications.

The composition of the invention can comprise further additives alongside the at least one thermoplastic polyurethane based on at least one diisocyanate and on at least one polyesterdiol, the at least one metal hydroxide, and the at least one phosphorus-containing flame retardant.

It is preferable that the composition of the invention comprises no inorganic oxides, where for the purposes of the present invention the expression "inorganic oxides" does not mean metal hydroxides. In particular, it is preferable that the compositions of the invention comprise no inorganic oxides of magnesium, calcium, barium, strontium, boron, aluminum, and zinc.

Accordingly, in one preferred embodiment, the present invention provides compositions comprising at least one thermoplastic polyurethane, at least one metal hydroxide, and at least one phosphorus-containing flame retardant, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC, as described above, where the composition is free from inorganic oxides of magnesium, calcium, barium, strontium, boron, aluminum, and zinc.

For the purposes of the present invention, the expression "free from" means that the composition comprises less than 1000 ppm of the respective compound.

In one preferred embodiment, the composition of the invention comprises, as further component, at least one phyllosilicate or hydrotalcite, or a mixture thereof. The compositions preferred in the invention comprising at least one phyllosilicate or hydrotalcite, or a mixture thereof in particular have good flame retardancy properties and good aging resistance.

Accordingly, a preferred embodiment of the present invention also provides a composition comprising at least one thermoplastic polyurethane based on at least one diisocyanate and on at least one polyesterdiol, at least one metal hydroxide, and at least one phosphorus-containing flame retardant, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC, as described above, where the composition comprises at least one phyllosilicate or hydrotalcite, or a mixture thereof.

Accordingly, a preferred embodiment of the present invention also provides a composition comprising at least one thermoplastic polyurethane, at least one metal hydroxide, at least one phosphorus-containing flame retardant, and at least one phyllosilicate or hydrotalcite, or a mixture thereof, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC.

Phyllosilicates/Hydrotalcite

In principle, any phyllosilicate is suitable for the purposes of the present invention, examples being two-layer minerals, such as kaolinite and serpentine, three-layer minerals, such as montmorillonite or mica, and clay minerals, such as bentonites. It is preferable that the compositions of the invention comprise bentonites, or a mixture of bentonites and of other phyllosilicates, or hydrotalcite.

In another preferred embodiment, intercalated phyllosilicates are used. Starting phyllosilicates for said intercalated phyllosilicates are preferably swellable smectites, such as montmorillonite, hectorite, saponite, beidellite, or bentonite.

For the purposes of the present invention, particularly suitable materials are organically intercalated phyllosilicates in which the layer separation is about 1.5 nm to 4 nm. Said phyllosilicates are preferably those intercalated with quaternary ammonium compounds, with protonated amines, with organic phosphonium ions, and/or with aminocarboxylic acids.

The composition of the invention can also comprise hydrotalcite or at least one phyllosilicate and hydrotalcite. Hydrotalcite also has a layer structure. The term hydrotalcite also covers comblainite, desautelsite, pyroaurite, reevesite, sergeevite, stichtite, and takovite. A hydrotalcite that is preferred for the purposes of the present invention is based on aluminum and magnesium and has been neutralized with hydroxide, nitrate, and/or carbonate ions in the intervening layers. A hydrotalcite preferred in the invention has the molecular formula $Mg_6Al_2[(OH)_{16}|CO_3].4H_2O$.

The hydrotalcites comprised in the compositions of the invention are preferably organically intercalated hydrotalcites, and this means that the anions located in the intervening layers, preferably the hydroxide cation, have been replaced at least to some extent by organic anions. Organic anions preferred for the purposes of the present invention are the anions of fatty acids and/or of hydrogenated fatty acids.

Organically intercalated phyllosilicates and organically intercalated hydrotalcites can be processed successfully in the compositions of the invention. By way of example, uniform dispersion of the phyllosilicates and/or of the hydrotalcite is achieved when organically intercalated phyllosilicates and/or organically intercalated hydrotalcites are mixed with the thermoplastic polyurethane.

Accordingly, a preferred embodiment of the present invention also provides compositions comprising at least one thermoplastic polyurethane, at least one metal hydroxide, and at least one phosphorus-containing flame retardant, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC, as described above, where these comprise at least one phyllosilicate or hydrotalcite, or a mixture thereof, where the phyllosilicate is an organically intercalated phyllosilicate, and/or the hydrotalcite is an organically intercalated hydrotalcite.

In one preferred embodiment, the present invention also provides compositions comprising at least one thermoplastic polyurethane, at least one metal hydroxide, and at least one phosphorus-containing flame retardant, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC, as described above, where the phyllosilicate is bentonite.

The amount comprised of the at least one phyllosilicate or hydrotalcite, or of the mixture thereof in the composition of the invention is preferably in the range from 0.5% by weight to 20% by weight, with preference from 3% by weight to 15% by weight, and with particular preference from 3% by weight to 8% by weight, based in each case on the entire composition.

Accordingly, another preferred embodiment of the present invention also provides compositions comprising at least one thermoplastic polyurethane, at least one metal hydroxide, and at least one phosphorus-containing flame retardant, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC, as described above, where the amounts comprised of the at least one phyllosilicate or hydrotalcite, or the mixture thereof are in the range from 0.5% by weight to 20% by weight, based on the entire composition.

Unless otherwise stated, all of the other data by weight for the constituents are likewise based on the entire composition. The selection of the amount of the components comprised in the composition here is such that, unless otherwise stated, the entirety of all of the components of the composition gives 100% by weight.

Thermoplastic Polyurethanes

Thermoplastic polyurethanes are known in principle. They are usually produced through reaction of the following components: (a) isocyanates and (b) compounds reactive toward isocyanates, and optionally (c) chain extenders, optionally in the presence of at least one (d) catalyst and/or of (e) conventional auxiliaries and/or additives. The following components: (a) isocyanate, (b) compounds reactive toward isocyanates, (c) chain extenders are also, individually or together, termed structural components.

The compositions of the invention comprise at least one thermoplastic polyurethane based on at least one diisocyanate and on at least one polyesterdiol, and has a weight-average molar mass in the range from 50 000 g/mol to 200 000 g/mol, measured by means of GPC. Accordingly, at least one polyesterdiol is used as component (b) for producing the polyurethanes comprised in the compositions of the invention.

Organic isocyanates (a) used are preferably aliphatic, cycloaliphatic, araliphatic, and/or aromatic isocyanates, particularly preferably aromatic isocyanates. Further preference is given to tri-, tetra-, penta-, hexa-, hepta-, and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane(isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, and/or dicyclohexylmethane 4,4'-, 2,4'- and 2,2'-diisocyanate, diphenylmethane 2,2'-, 2,4'- and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethyldiphenyl diisocyanate, 1,2-diphenylethane diisocyanate, and/or phenylene diisocyanate. It is particularly preferable to use 4,4'-MDI.

Accordingly, a preferred embodiment of the present invention also provides a composition comprising at least one thermoplastic polyurethane, at least one metal hydroxide, and at least one phosphorus-containing flame retardant, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC, as described above, where the diisocyanate is an aromatic diisocyanate.

Compounds (b) used in the invention and reactive toward isocyanates comprise at least one polyesterdiol.

In principle, it is possible to use any of the suitable polyesterdiols in the invention.

Suitable polyesterdiols can by way of example be produced from organic dicarboxylic acids having from 2 to 12 carbon atoms, preferably aromatic dicarboxylic acids having from 8 to 12 carbon atoms, and from polyhydric alcohols, preferably diols, having from 2 to 12 carbon atoms, preferably from 2 to 6 carbon atoms. Examples of dicarboxylic acids that can be used are: succinic acid, glutaric acid, adipic acid, suberic acid, azelaic acid, sebacic acid, decanedicarboxylic acid, maleic acid, fumaric acid, and phthalic acid, isophthalic acid, terephthalic acid, and the isomeric naphthalenedicarboxylic acids. The dicarboxylic acids here can be used either individually or else in a mixture with one another. It is also possible to use, instead of the free dicarboxylic acids, the corresponding dicarboxylic acid derivatives, such as dicarboxylic esters of alcohols having from 1 to 4 carbon atoms, or dicarboxylic anhydrides. Examples of di- and polyhydric alcohols, in particular diols, are ethanediol, diethylene glycol, 1,2- or 1,3-propanediol, dipropylene glycol, 1,4-butanediol, 1,5-pentanediol, 1,6-hexanediol, 1,10-decanediol, glycerol, and trimethylolpropane, preferably ethylene glycol, 1,3-propanediol, methyl-1,3-propanediol, 1,4-butanediol, 3-methyl-1,5-pentanediol, or 1,6-hexanediol. Examples of other compounds suitable in the invention are polyesterdiols made of lactones, for example ε-caprolactone, or hydroxycarboxylic acids, e.g. ω-hydroxycaproic acid, and hydroxybenzoic acids.

The reaction conditions for carboxylic acid and alcohol are usually selected in such a way that the resultant polyesterols have no free acid groups. The actual functionality of the resultant polyesterols is usually from 1.9 to 2.1, preferably 2.0.

The polyesterols can be produced by polycondensing the mixtures of acids and alcohols without catalyst or preferably in the presence of esterification catalysts, advantageously in an atmosphere made of inert gases, e.g. nitrogen, carbon monoxide, helium, or argon. The polycondensation process can be carried out at temperatures of from 150 to 250° C., preferably from 180 to 220° C., optionally at reduced pressure. The polycondensation process is usually continued until a desired acid number has been reached, and this is advantageously smaller than 10, preferably smaller than 2. The polyesterols are produced by polycondensing acids and alcohols in a molar ratio that is usually 1:1 to 1.8, preferably 1:1.05 to 1.2.

It is particularly preferable for the purposes of the present invention to use polyesterdiols made of ε-caprolactone, and to use, as polyesterdiols, condensates of adipic or sebacic acid with at least one alcohol selected from the group consisting of ethylene glycol, 1,3-propanediol, methyl-1,3-propanediol, 1,4-butanediol, 3-methyl-1,5-pentanediol, and 1,6-hexanediol.

Accordingly, a preferred embodiment of the present invention also provides a composition comprising at least one thermoplastic polyurethane, at least one metal hydroxide, and at least one phosphorus-containing flame retardant, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC, as described above, where the polyesterdiol is one selected from polyesterdiols made of ε-caprolactone and condensates of adipic or sebacic acid with at least one alcohol selected from the group consisting of ethylene glycol, 1,3-propanediol, methyl-1,3-propanediol, 1,4-butanediol, 3-methyl-1,5-pentanediol, and 1,6-hexanediol.

Another preferred embodiment of the present invention also provides compositions as described above comprising at least one thermoplastic polyurethane based on at least one diisocyanate and on at least one polyesterdiol, and has a weight-average molar mass in the range from 50 000 g/mol to 200 000 g/mol, measured by means of GPC, where the polyesterdiol is one selected from polyesterdiols made of ε-caprolactone, and condensates of adipic or sebacic acid with at least one alcohol selected from the group consisting of ethylene glycol, 1,3-propanediol, methyl-1,3-propanediol, 1,4-butanediol, 3-methyl-1,5-pentanediol, and 1,6-hexanediol, and the diisocyanate is an aromatic diisocyanate.

The number-average molecular weight Mn of the polyesterdiols used is preferably in the range from 500 to 4000, determined by way of GPC, with preference in the range from 650 to 3500, determined by GPC, with particular preference in the range from 800 to 3000, determined by way of GPC. The person skilled in the art is aware of suitable conditions for molecular weight determination by means of GPC.

Chain extenders (c) which can be used preferably comprise aliphatic, araliphatic, aromatic, and/or cycloaliphatic compounds with a molar mass of from 0.05 kg/mol to 0.499 kg/mol, preferably difunctional compounds, for example diamines and/or alkanediols having from 2 to 10 carbon atoms in the alkylene moiety, di-, tri-, tetra-, penta-, hexa-, hepta-, octa-, nona-, and/or decaalkylene glycols having from 3 to 8 carbon atoms, in particular ethylene 1,2-glycol, 1,3-propanediol, 1,4-butanediol, 1,6-hexanediol, and preferably corresponding oligo- and/or polypropylene glycols, and it is also possible here to use mixtures of the chain extenders. It is preferable that the compounds (c) have only primary hydroxy groups, and very particular preference is given to 1,4-butanediol.

In one preferred embodiment, catalysts (d) which in particular accelerate the reaction between the NCO groups of the diisocyanates (a) and the hydroxy groups of the compound (b) reactive toward isocyanates and the chain extender (c) are tertiary amines, in particular triethylamine, dimethylcyclohexylamine, N-methylmorpholine, N,N'-dimethylpiperazine, 2-(dimethylaminoethoxy)ethanol, or diazabicyclo[2.2.2]octane, and in another preferred embodiment these are organometallic compounds, such as titanic esters, iron compounds, preferably iron(III) acetylacetonate, tin compounds, preferably tin diacetate, tin dioctoate, tin dilaurate, or the dialkyltin salts of aliphatic carboxylic acids, preferably dibutyltin diacetate, dibutyltin dilaurate, or bismuth salts in which bismuth is preferably present in the oxidation state 2 or 3, in particular 3. Preference is given to salts of carboxylic acids. Carboxylic acids used are preferably carboxylic acids having from 6 to 14 carbon atoms, particularly preferably having from 8 to 12 carbon atoms. Examples of suitable bismuth salts are bismuth(III) neodecanoate, bismuth 2-ethylhexanoate, and bismuth octanoate. Preferred amounts used of the catalysts (d) are from 0.0001 to 0.1 part by weight per 100 parts by weight of the compound (b) reactive toward isocyanates. It is preferable to use tin catalysts, in particular tin dioctoate.

Materials that can be added to the structural components (a) to (c) are not only catalysts (d) but also conventional auxiliaries (e). Mention may be made by way of example of surfactant substances, fillers, further flame retardants, nucleating agents, oxidation stabilizers, lubricants and mold-release aids, dyes, and pigments, and optionally stabilizers, e.g. for protection from hydrolysis, light, heat, or discoloration, inorganic and/or organic fillers, reinforcing agents, and plasticizers. Suitable auxiliaries and additives can be found by way of example in Kunststoffhandbuch [Plastics handbook], volume VII, edited by Vieweg and Höchtlen, Carl Hanser Verlag, Munich 1966 (pp. 103-113).

Suitable production processes for thermoplastic polyurethanes are disclosed by way of example in EP 0922552 A1, DE 10103424 A1, or WO 2006/072461 A1. The production process usually takes place in a belt system or a reactive extruder, but can also take place on a laboratory scale, for example by the manual casting process. As a function of the physical properties of the components, these are all directly mixed with one another or individual components are premixed and/or prereacted, e.g. to give prepolymers, and only then subjected to the polyaddition reaction. In another embodiment, a thermoplastic polyurethane is first produced from the structural components, optionally with catalyst, and auxiliaries can then optionally have been incorporated into the polyurethane. At least one flame retardant is then introduced into said material, and homogeneously dispersed. The homogeneous dispersion is preferably achieved in an extruder, preferably in a twin-screw extruder. In order to adjust the hardness of the TPUs, the amounts used of the structural components (b) and (c) can be varied within a relatively wide range of molar ratios, and hardness here usually rises as content of chain extender (c) increases.

To produce thermoplastic polyurethanes such as those with a Shore A hardness of less than 95, preferably from 95 to 75 Shore A, particularly preferably about 85 A, by way of example, the polyhydroxy compounds (b) that are in essence difunctional, and chain extenders (c) can be used advantageously in molar ratios of from 1:1 to 1:5, preferably from 1:1.5 to 1:4.5, so that the resultant mixtures of the structural components (b) and (c) have a hydroxy equivalent weight of more than 200, and in particular from 230 to 450, while to produce harder TPUs, e.g. those with Shore A hardness of more than 98, preferably from 55 to 75 Shore D, the (b):(c) molar ratios are in the range from 1:5.5 to 1:15, preferably from 1:6 to 1:12, so that the hydroxy equivalent weight of the resultant mixtures of (b) and (c) is from 110 to 200, preferably from 120 to 180.

To produce the thermoplastic polyurethanes of the invention, the structural components (a), (b), and (c) are preferably reacted in the presence of catalysts (d) and optionally of auxiliaries and/or additives (e) in amounts such that the equivalence ratio of NCO groups of the diisocyanates (a) to the entirety of the hydroxy groups of the structural components (b) and (c) is from 0.9 to 1.1:1, preferably from 0.95 to 1.05:1, and in particular approximately 0.96 to 1.0:1.

The composition of the invention comprises an amount in the range from 20% by weight to 90% by weight of the at least one thermoplastic polyurethane, based on the entire composition, preferably an amount in the range from 30% by weight to 75% by weight, more preferably an amount in the range from 40% by weight to 60% by weight, and particularly preferably an amount in the range from 45% by weight to 55% by weight, based in each case on the entire composition.

In one embodiment, to produce the compositions of the invention, thermoplastic polyurethane and flame retardant are processed in one operation. In other preferred embodiments, to produce the compositions of the invention, a thermoplastic polyurethane is first produced, preferably in the form of granules, by a reactive extruder, a belt system, or other suitable apparatuses, and then, in at least one further operation, or else in a plurality of operations, at least one further flame retardant is introduced into this polyurethane.

The mixing of the thermoplastic polyurethane with the at least one flame retardant, in particular with the at least one metal hydroxide, the at least one phosphorus-containing flame retardant, and optionally with at least one phyllosilicate and/or hydrotalcite, takes place in a mixing device which is preferably an internal mixer or an extruder, preferably a twin-screw extruder. The metal hydroxide is preferably an aluminum hydroxide. In one preferred embodiment, at least one flame retardant introduced into the mixing device in the at least one further operation is liquid, i.e. liquid at a temperature of 21° C. In another preferred embodiment of the use of an extruder, the flame retardant introduced is liquid at a temperature which prevails behind the feed point in the direction of flow of the contents in the extruder.

The weight-average molar mass of the thermoplastic polyurethane in the composition of the invention is in the range from 50 000 g/mol to 200 000 g/mol. This molar mass is the molar mass of the thermoplastic polyurethane in the composition, i.e. after the composition of the invention has been produced. The molar mass of the thermoplastic polyurethane in the composition of the invention can deviate from the molar mass of the thermoplastic polyurethane used to produce the composition of the invention. It is preferable that the weight-average molar mass of the at least one thermoplastic polyurethane in the composition of the invention is in the range from 60 000 g/mol to 150 000 g/mol, preferably in the range from 70 000 g/mol to 135 000 g/mol, particularly preferably from 80 000 g/mol to 120 000 g/mol, more preferably in the range from 90 000 g/mol to 110 000 g/mol.

As described above, the molar mass of the thermoplastic polyurethanes is determined here by means of GPC for the purposes of the present invention as in example 1 (two GPC columns arranged in series: PSS gel; 100 A; 5μ; 300*8 mm, Jordi DVB gel; mixed bed; 5μ; 250*10 mm; column temperature 60° C.; flow rate 1 mL/min; RI detector). Polymethyl methacrylate (EasyCal; PSS, Mainz) is used for calibration here, and dimethylformamide is used as eluent.

Accordingly, in one preferred embodiment, the present invention also provides a composition comprising at least one thermoplastic polyurethane, at least one metal hydroxide, and at least one phosphorus-containing flame retardant, where the thermoplastic polyurethane is a thermoplastic polyurethane based on at least one diisocyanate and on at least one polyesterdiol, and has a weight-average molar mass in the range from 90 000 g/mol to 110 000 g/mol, measured by means of GPC.

Metal Hydroxide

The composition of the invention comprises at least one metal hydroxide. In the event of a fire, metal hydroxides release only water and do not therefore form any toxic or corrosive smoke products. These hydroxides are moreover capable of reducing smoke density in the event of a fire. However, a disadvantage of said substances is that they sometimes promote the hydrolysis of thermoplastic polyurethanes and also affect the oxidative aging of the polyurethanes.

Materials preferably suitable for the purposes of the present invention are hydroxides of magnesium, of calcium, of zinc, and/or of aluminum, and mixtures of these. The metal hydroxide is particularly preferably one selected from the group consisting of aluminum hydroxides, aluminum oxide hydroxides, magnesium hydroxide, and mixtures of two or more of said hydroxides.

Accordingly, another preferred embodiment of the present invention also provides compositions comprising at least one thermoplastic polyurethane, at least one metal hydroxide, and at least one phosphorus-containing flame retardant, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC, as described above where the metal hydroxide is one selected from the group consisting of aluminum hydroxides, aluminum oxide hydroxides, magnesium hydroxide, and mixtures of two or more of these hydroxides.

A preferred mixture is aluminum hydroxide and magnesium hydroxide. Particular preference is given to magnesium hydroxide or aluminum hydroxide. Very particular preference is given to aluminum hydroxide.

Accordingly, another preferred embodiment of the present invention also provides a composition comprising at least one thermoplastic polyurethane, at least one metal hydroxide, and at least one phosphorus-containing flame retardant, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC, as described above, where the metal hydroxide is aluminum hydroxide.

The proportion of the at least one metal hydroxide in the composition of the invention is preferably in the range from 10% by weight to 80% by weight. At higher fill levels, the mechanical properties of the corresponding polymer materials are unacceptably impaired: in particular, there is an unacceptable deterioration of tensile strength and of elongation at break, these being important for cable insulation. The proportion of the metal hydroxide in the composition of the invention is preferably in the range from 10% by weight to 65% by weight, more preferably in the range from 20% by weight to 50% by weight, more preferably in the range from 25% by weight to 40% by weight, based in each case on the entire composition.

The specific surface area of the metal hydroxides used in the invention is usually from 2 $m^2/g$ to 150 $m^2/g$, but the specific surface area is preferably from 2 $m^2/g$ to 9 $m^2/g$, more preferably from 3 $m^2/g$ to 8 $m^2/g$, and particularly preferably from 3 $m^2/g$ to 5 $m^2/g$. Specific surface area is determined using nitrogen and the BET method in accordance with DIN ISO 9277:2003-05.

Coated Metal Hydroxides

In the invention, there can be a coating at least to some extent surrounding the surface of the metal hydroxides, this also being termed an at least partial coating. The coating is equivalent to a surface treatment. The coating adheres purely physically on the metal hydroxide by virtue of interlocking or of van der Waals forces, or has chemical bonding to the metal hydroxide. This is achieved predominantly through covalent interaction.

The surface treatment or else surface modification that leads to a coating around the included component, in the present instance the metal hydroxide, in particular the aluminum hydroxide, is described in detail in the literature. "Particulate-Filled Polymer Composites" (2nd Edition), edited by: Rothon, Roger N., 2003, Smithers Rapra Technology, is a basic reference work which describes suitable materials, and also the coating technology. Chapter 4 is particularly relevant. Appropriate materials are available commercially, for example from the company Nabaltec, Schwandorf, or Martinswerke in Bergheim, both in Germany.

Preferred coating materials are saturated or unsaturated polymers having an acid function, preferably comprising at least one acrylic acid or one anhydride, preferably maleic anhydride, since these materials are deposited particularly successfully onto the surface of the metal hydroxide.

The polymer involves one polymer or a mixture of polymers, preferably one polymer. Preferred polymers are polymers of mono- and diolefins, mixtures thereof, copolymers of mono- and diolefins with one another or with other vinyl monomers, polystyrene, poly(p-methylstyrene), poly(alpha-methylstyrene), and copolymers of styrene or alpha-methylstyrene with dienes or with acrylic derivatives, graft copolymers of styrene or alpha-methylstyrene, halogen-containing polymers, polymers that derive from alpha- or beta-unsaturated acids and from derivatives of these, and copolymers of said monomers with one another or with other unsaturated monomers.

Coating materials likewise preferred are monomeric organic acids and their salts, preferably saturated fatty acids, while unsaturated acids are less commonly used. Preferred fatty acids comprise from 10 to 30 carbon atoms, preferably from 12 to 22, in particular from 16 to 20 carbon atoms, and are aliphatic and preferably have no double bonds. Stearic acid is very particularly preferred. Preferred fatty acid derivatives are their salts, preferably of calcium, aluminum, magnesium, or zinc. Calcium is particularly preferred, in particular in the form of calcium stearate.

Other preferred substances which form a coating around the metal hydroxide, preferably the aluminum hydroxide, are organosilane compounds having the following structure:

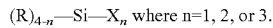

$(R)_{4-n}$—Si—$X_n$, where n=1, 2, or 3.

X is a hydrolysable group which reacts with the surface of the metal hydroxide, and is also termed a coupling group. It is preferable that the moiety R is a hydrocarbon moiety and that the selection is such that the organosilane compound has good miscibility with the thermoplastic polyurethane. The moiety R has bonding to the silicon by way of a hydrolytically stable carbon-silicon bond, and can be reactive or inert. An example of a reactive moiety, which is preferably an unsaturated hydrocarbon moiety, is an allyl moiety. It is preferable that the moiety R is inert, and it is more preferably a saturated hydrocarbon moiety having from 2 to 30 carbon atoms, preferably from 6 to 20 carbon atoms, and particularly preferably from 8 to 18 carbon atoms, and it is more preferable that an aliphatic hydrocarbon moiety is involved, where this is a branched-chain or linear moiety.

It is more preferable that the organosilane compound comprises only one moiety R and has the general formula:

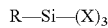

R—Si—$(X)_3$

It is preferable that the coupling group X is a halogen, preferably chlorine, and that the coupling reagent is accordingly a tri-, di- or monochlorosilane. It is likewise preferable that the coupling group X is an alkoxy group, preferably a methoxy group or an ethoxy group. It is very preferable that the moiety is the hexadecyl radical, preferably using the methoxy coupling group or ethoxy coupling group, the organosilane thus being the hexadecylsilane.

The amounts of the silanes applied to the metal hydroxide are from 0.1% by weight to 5% by weight, more preferably from 0.5% by weight to 1.5% by weight, and particularly preferably about 1% by weight, based on the total amount of the metal hydroxide. The amounts of the carboxylic acids and carboxylic acid derivatives applied to the metal hydroxide are from 0.1% by weight to 5% by weight, more preferably from 1.5% by weight to 5% by weight, and particularly preferably from 3% by weight to 5% by weight, based on the total amount of the metal hydroxide.

It is preferable that the maximum dimension of more than 50%, more preferably more than 70%, more preferably more than 90%, of the metal hydroxides surrounded to some extent by a coating is less than 10 μm, preferably less than 5 μm, particularly preferably less than 3 μm. At the same time, at least one maximum dimension of at least 50% of the particles, preferably at least 70%, more preferably at least 90%, is more than 0.1 μm, more preferably more than 0.5 μm, and particularly preferably more than 1 μm.

It is preferable that production of the thermoplastic polyurethanes of the invention uses previously coated metal hydroxides. This is the only way of avoiding undesired side reactions of the coating materials with the constituents of the thermoplastic polyurethane, and is a particularly effective way of providing the advantage of inhibiting oxidative degradation of the thermoplastic polyurethane. The coating of the metal hydroxide can also more preferably take place in the feed region of the extruder, before the polyurethane is added in a downstream portion of the extruder.

Accordingly, in another preferred embodiment, the present invention also provides a composition comprising at least one thermoplastic polyurethane, at least one metal hydroxide, and at least one phosphorus-containing flame retardant, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC, as described above, where a coating surrounds the metal hydroxide at least to some extent.

Phosphorus-Containing Flame Retardants

The compositions of the invention comprise at least one phosphorus-containing flame retardant. The invention can in principle use any of the known phosphorus-containing flame retardants for thermoplastic polyurethanes.

For the purposes of the present invention, preference is given to derivatives of phosphoric acid, derivatives of phosphonic acid, or derivatives of phosphinic acid, or a mixture of two or more of these derivatives.

Accordingly, another embodiment of the present invention also provides a composition comprising at least one thermoplastic polyurethane, at least one metal hydroxide, and at least one phosphorus-containing flame retardant, where the thermoplastic ployurethane is a thermoplastic polyurethane based on at least one diisocyanate and on at least one polyesterdiol, and has a weight-average molar mass in the range from 50 000 g/mol to 200 000 g/mol, measured by means of GPC, as described above, where the phosphorus-containing flame retardant is one selected from the group consisting of derivatives of phosphoric acid, derivatives of phosphonic acid, derivatives of phosphinic acid, and mixtures of two or more of these derivatives.

In another preferred embodiment, the phosphorus-containing flame retardant is liquid at 21° C.

It is preferable that the derivatives of phosphoric acid, phosphonic acid, or phosphinic acid involve salts with an organic or inorganic cation, or involve organic esters. Organic esters are derivatives of the phosphorus-containing acids where at least one oxygen atom bonded directly to the phosphorus has been esterified with an organic moiety. In one preferred embodiment, the organic ester involves an alkyl ester, and in another preferred embodiment it involves an aryl ester. It is particularly preferable that all of the hydroxy groups of the corresponding phosphorus-containing acid have been esterified.

Organic phosphate esters are preferred, particularly the triesters of phosphoric acid, for example trialkyl phosphates and in particular triaryl phosphates, e.g. triphenyl phosphate.

Phosphoric esters of the general formula (I)

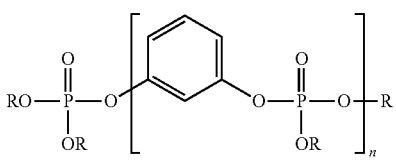

are preferred in the invention as flame retardants for the thermoplastic polyurethanes, where R is optionally substituted alkyl, cycloalkyl, or phenyl groups, and n=from 1 to 15.

If R in the general formula (I) is an alkyl moiety, alkyl moieties that can in particular be used are those having from 1 to 8 carbon atoms. The cyclohexyl moiety may be mentioned as an example of the cycloalkyl groups. It is preferable to use phosphoric esters of the general formula (I) in which R=phenyl or alkyl-substituted phenyl. n in the general formula (I) is in particular 1, or is preferably in the range of about 3 to 6. Examples that may be mentioned for the preferred phosphoric esters of the general formula (I) are bis(diphenyl) 1,3-phenylenephosphate, bis(dixylenyl) 1,3-phenylenephosphate, and also the corresponding oligomeric products with an average degree of oligomerization of n=from 3 to 6. A preferred resorcinol is resorcinol bis(diphenyl phosphate) (RDP), usually present in oligomers.

Other preferred phosphorus-containing flame retardants are bisphenol A bis(diphenyl phosphate) (BDP), which usually takes the form of oligomer, and diphenyl cresyl phosphate (DPC).

Accordingly, another embodiment of the present invention also provides a composition comprising at least one thermoplastic polyurethane, at least one metal hydroxide, and at least one phosphorus-containing flame retardant, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC, as described above, where the phosphorus-containing flame retardant is one selected from the group consisting of resorcinol bis(diphenyl phosphate) (RDP), bisphenol A bis (diphenyl phosphate) (BDP), and diphenyl cresyl phosphate (DPC).

The organic phosphonates involve salts with an organic or inorganic cation or involve the esters of phosphonic acid. Preferred esters of phosphonic acid are the diesters of alkyl- or phenylphosphonic acids. The phosphonates of the general formula (II) may be mentioned by way of example for the phosphonic esters to be used as flame retardants in the invention

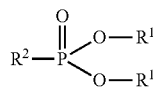

where
R$^1$ is optionally substituted alkyl, cycloalkyl, or phenyl groups, where the two moieties R$^1$ can also have cyclic linkage to one another, and
R$^2$ is an optionally substituted alkyl, cycloalkyl, or phenyl moiety.
Cyclic phosphonates, e.g.

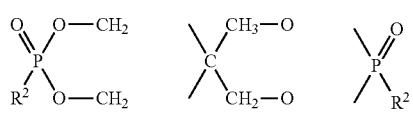

are particularly suitable here, where R$^2$=CH$_3$ and C$_6$H$_5$, where these derive from pentaerythritol, or

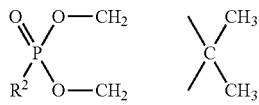

where R$^2$=CH$_3$ and C$_6$H$_5$, where these derive from neopentyl glycol, or

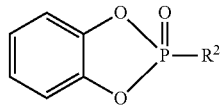

where R$^2$=CH$_3$ and C$_6$H$_5$, where these derive from pyrocatechol, or else

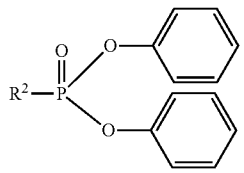

where R$^2$=an unsubstituted or else substituted phenyl moiety.

Phosphinic esters have the general formula R$^1$R$^2$(P=O) OR$^3$, where all three organic groups R$^1$, R$^2$, and R$^3$ can be identical or different. The moieties R$^1$, R$^2$, and R$^3$ are either aliphatic or aromatic, and have from 1 to 20 carbon atoms, preferably from 1 to 10, more preferably from 1 to 3. It is preferable that at least one of the moieties is aliphatic, and it is preferable that all of the moieties are aliphatic, and it is very particularly preferable that R$^1$ and R$^2$ are ethyl moieties.

More preferably, R$^3$ is also an ethyl moiety, or is a methyl moiety. In one preferred embodiment, R$^1$, R$^2$, and R$^3$ are simultaneously an ethyl moiety or methyl moieties.

Preference is also given to phosphinates, i.e. the salts of phosphinic acid. The moieties R$^1$ and R$^2$ are either aliphatic or aromatic, and have from 1 to 20 carbon atoms, preferably from 1 to 10, more preferably from 1 to 3. It is preferable that at least one of the moieties is aliphatic, and it is preferable that all of the moieties are aliphatic, and it is very particularly preferable that R$^1$ and R$^2$ are ethyl moieties. Preferred salts of phosphinic acids are aluminum, calcium, or zinc salts. One preferred embodiment is diethylaluminum phosphinate.

The phosphorus-containing flame retardants, their salts, and/or their derivatives are used in the form of single substance or in mixtures in the compositions of the invention.

For the purposes of the present invention, the amount used of the at least one phosphorus-containing flame retardant is such that the phosphorus content, based on the entire phosphorus-containing flame retardant, is greater than 5% by weight, more preferably greater than 7% by weight. At the same time, the content of phosphorus-containing flame retardants in the composition is by way of example less than 30% by weight, preferably less than 20% by weight, and particularly preferably less than 15% by weight. The amount comprised of the at least one phosphorus-containing flame retardant is preferably in the range from 3% by weight to 30% by weight, more preferably in the range from 5% by weight to 20% by weight, and particularly preferably in the range from 8% by weight to 15% by weight, based in each case on the entire composition.

In one preferred embodiment, the composition of the invention comprises, as phosphorus-containing flame retardant, resorcinol bis(diphenyl phosphate) (RDP). In another preferred embodiment, the composition of the invention comprises aluminum hydroxide and, as phosphorus-containing flame retardant, resorcinol bis(diphenyl phosphate) (RDP). In another preferred embodiment, the composition of the invention comprises aluminum hydroxide and a phyllosilicate and/or hydrotalcite and, as phosphorus-containing flame retardant, resorcinol bis(diphenyl phosphate) (RDP).

The combination of the various flame retardants optimizes mechanical properties and flame retardancy properties for the respective requirement.

In the present invention, the phosphorus-containing flame retardant, in particular the phosphoric esters, phosphonic esters, and/or phosphinic esters, and/or their salts, are used as flame retardant in a mixture together with at least one metal hydroxide. The ratio by weight here of the total weight of the phosphate esters, phosphonate esters, and phosphinate esters used to the weight of the metal hydroxide used in the composition of the invention is preferably in the range from 1:5 to 1:2.

The amount comprised of the at least one phosphorus-containing flame retardant is moreover preferably in the range from 3% by weight to 30% by weight, more preferably in the range from 5% by weight to 20% by weight, and particularly preferably in the range from 8% by weight to 15% by weight, based in each case on the entire composition.

At the same time, the amount comprised of the at least one metal hydroxide is preferably in the range from 10% by weight to 65% by weight, based on the entire composition, preferably in the range from 15% by weight to 50% by weight, and particularly preferably in the range from 25% by weight to 40% by weight, based in each case on the entire composition.

Accordingly, another preferred embodiment of the present invention also provides a composition comprising at least one thermoplastic polyurethane, at least one metal hydroxide, and at least one phosphorous-containing flame retardant, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC, as described above, where the proportion of the metal hydroxide in the composition is in the range from 10 to 65%, based on the entire composition.

In another preferred embodiment, the present invention also provides a composition comprising at least one thermoplastic polyurethane, at least one metal hydroxide, and at least one phosphorus-containing flame retardant, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC, as described above, where the proportion of the phosphorus-containing flame retardant is in the range from 3 to 30%, based on the entire composition.

In another preferred embodiment, the present invention therefore also provides a composition comprising at least one thermoplastic polyurethane, at least one metal hydroxide, and at least one phosphorus-containing flame retardant, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC, as described above, where the proportion of the metal hydroxide in the composition is in the range from 10 to 65%, based on the entire composition, and the proportion of the phosphorus-containing flame retardant is in the range from 3 to 30%, based on the entire composition.

If the composition of the invention comprises at least one phyllosilicate or hydrotalcite, or a mixture thereof, the proportion of the total of the percentages by weight (% by weight) of the at least one metal hydroxide, of the at least one phosphorus-containing flame retardant, and of the at least one phyllosilicate or hydrotalcite, or a mixture thereof, where the entirety is also termed flame retardant, in the composition of the invention is preferably in the range from 10% by weight to 80% by weight, based on the entire composition, with preference in the range from 25% by weight to 70% by weight, with further preference in the range from 40% by weight to 60% by weight, and with particular preference in the range from 45% by weight to 55% by weight.

Accordingly, another preferred embodiment of the present invention also provides a composition comprising at least one thermoplastic polyurethane, at least one metal hydroxide, at least one phosphorus-containing flame retardant, and at least one phyllosilicate or hydrotalcite, or a mixture thereof, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC, as described above, where the proportion of the total of the proportions by weight of the at least one metal hydroxide, of the at least one phosphorus-containing flame retardant, and of the at least one phyllosilicate or hydrotalcite, or a mixture thereof, is in the range from 10 to 80%, based on the entire composition.

The proportions by weight of the at least one phosphorus-containing flame retardant:metal hydroxide:the at least one phyllosilicate, or hydrotalcite, or the mixture thereof can be described as a:b:c, where a can vary by way of example in the range from 5 to 15 in the invention, b can vary by way of example in the range from 30 to 40 in the invention, and c can vary by way of example in the range from 0 to 8 in the invention, preferably in the range from 3 to 8. More preferably, the proportions by weight of the at least one phosphorus-containing flame retardant:metal hydroxide:the at least one phyllosilicate, or hydrotalcite, or the mixture thereof are approximately described by the relationship 9:34:5.

The present invention also provides the use of the composition of the invention comprising at least one flame-retardant thermoplastic polyurethane as described above, for producing a coating, damping elements, folding bellows, foils or fibers, moldings, flooring for buildings and transport, nonwoven textiles, and preferably gaskets, rollers, shoe soles, hoses, a cable, a cable plug, cable sheathing, cushions, laminates, profiles, drive belts, saddles, foams, plug connectors, a drag cable, solar modules, and cladding in automobiles. The use for producing cable sheathing is preferred. The production process, preferably starting from granules, uses injection molding, calendering, powder sintering, or extrusion, and/or additional foaming of the composition of the invention.

Accordingly, the present invention also provides the use of a composition comprising at least one thermoplastic polyurethane, at least one metal hydroxide, and at least one phosphorus-containing flame retardant, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC, as described above, for producing cable sheathing.

In one preferred embodiment, the present invention also provides the use of a composition comprising at least one thermoplastic polyurethane, at least one metal hydroxide, at least one phosphorus-containing flame retardant, and at least one phyllosilicate or hydrotalcite, or a mixture thereof, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC, as described above, for producing cable sheathing.

Further embodiments of the present invention can be found in the claims and in the examples. The abovementioned features of the product/process/uses of the invention, and those explained below, can of course be used not only in the respective stated combination but also in other combinations, without exceeding the scope of the invention. By way of example, therefore, a combination of a preferred feature with a particularly preferred feature, or of a feature that is not further characterized with a particularly preferred feature, etc., is implicitly comprised even if said combination is not expressly mentioned.

Examples of embodiments of the present invention are listed below, but these do not restrict the present invention. In particular, the present invention also comprises embodiments which result from the references given below and thus from combinations.

1. Composition comprising at least one thermoplastic polyurethane, at least one metal hydroxide, and at least one phosphorus-containing flame retardant, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC.
2. Composition according to embodiment 1, where the composition comprises at least one phyllosilicate or hydrotalcite, or a mixture thereof.
3. Composition according to embodiment 2, where the phyllosilicate is an organically intercalated phyllosilicate and/or the hydrotalcite is an organically intercalated hydrotalcite.
4. Composition according to embodiment 2 or 3, where the phyllosilicate is bentonite.
5. Composition according to any of embodiments 2 to 4, where the amount comprised of the at least one phyllosilicate or hydrotalcite, or of the mixture thereof, is in the range from 0.5% by weight to 20% by weight, based on the entire composition.
6. Composition according to any of embodiments 2 to 5, where the phyllosilicate is bentonite, and
where the amount comprised of the at least one phyllosilicate or hydrotalcite, or of the mixture thereof, is in the range from 0.5% by weight to 20% by weight, based on the entire composition.
7. Composition according to any of embodiments 1 to 6, where the polyesterdiol is one selected from polyesterdiols made of ε-caprolactone and condensates of adipic acid or sebacic acid with at least one alcohol selected from the group consisting of ethylene glycol, 1,3-propanediol, methyl-1,3-propanediol, 1,4-butanediol, 3-methyl-1,5-pentanediol, and 1,6-hexanediol.
8. Composition according to any of embodiments 1 to 7, where the diisocyanate is an aromatic diisocyanate.
9. Composition according to any of embodiments 1 to 6, where the polyesterdiol is one selected from polyesterdiols made of ε-caprolactone and condensates of adipic acid or sebacic acid with at least one alcohol selected from the group consisting of ethylene glycol, 1,3-propanediol, methyl-1,3-propanediol, 1,4-butanediol, 3-methyl-1,5-pentanediol, and 1,6-hexanediol, and
where the diisocyanate is an aromatic diisocyanate.
10. Composition according to any of embodiments 1 to 9, where the weight-average molar mass of the thermoplastic polyurethane is in the range from 90 000 g/mol to 110 000 g/mol, measured by means of GPC.
11. Composition according to any of embodiments 1 to 10, where the composition is free from inorganic oxides of magnesium, calcium, barium, strontium, boron, aluminum, and zinc.
12. Composition according to any of embodiments 1 to 11, where the proportion of the total of the proportions by weight of the at least one metal hydroxide, of the at least one phosphorus-containing flame retardant, and of the at least one phyllosilicate or hydrotalcite, or a mixture thereof is in the range from 10 to 80%, based on the entire composition.
13. Composition according to any of embodiments 1 to 12, where the metal hydroxide is one selected from the group consisting of aluminum hydroxides, aluminum oxide hydroxides, magnesium hydroxide, and mixtures of two or more of these hydroxides.
14. Composition according to any of embodiments 1 to 13, where the metal hydroxide is aluminum hydroxide.
15. Composition according to any of embodiments 1 to 14, where a coating surrounds the metal hydroxide at least to some extent.
16. Composition according to any of embodiments 1 to 15, where the phosphorus-containing flame retardant is one selected from the group consisting of derivatives of phosphoric acid, derivatives of phosphonic acid, derivatives of phosphinic acid, and mixtures of two or more of these derivatives.
17. Composition according to any of embodiments 1 to 16, where the phosphorus-containing flame retardant is one selected from the group consisting of resorcinol bis(diphenyl phosphate) (RDP), bisphenol A bis(diphenyl phosphate) (BDP), and diphenyl cresyl phosphate (DPC).
18. Composition according to any of embodiments 1 to 17, where the metal hydroxide is aluminum hydroxide, and
where the phosphorus-containing flame retardant is one selected from the group consisting of resorcinol bis (diphenyl phosphate) (RDP), bisphenol A bis(diphenyl phosphate) (BDP), and diphenyl cresyl phosphate (DPC).
19. Composition according to any of embodiments 1 to 18, where the proportion of the metal hydroxide in the composition is in the range from 10 to 65%, based on the entire composition.
20. Composition according to any of embodiments 1 to 19, where the proportion of the phosphorus-containing flame retardant is in the range from 3 to 30%, based on the entire composition.
21. Composition according to any of embodiments 1 to 18, where the proportion of the metal hydroxide in the composition is in the range from 10 to 65%, based on the entire composition, and the proportion of the phosphorus-containing flame retardant is in the range from 3 to 30%, based on the entire composition.
22. Composition comprising at least one thermoplastic polyurethane, at least one metal hydroxide, and at least one phosphorus-containing flame retardant, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC, where the polyesterdiol is one selected from polyesterdiols made of ϵ-caprolactone and condensates of adipic acid or sebacic acid with at least one alcohol selected from the group consisting of ethylene glycol, 1,3-propanediol, methyl-1,3-propanediol, 1,4-butanediol, 3-methyl-1,5-pentanediol, and 1,6-hexanediol, and
where the diisocyanate is an aromatic diisocyanate.
23. Composition comprising at least one thermoplastic polyurethane, at least one metal hydroxide, and at least one phosphorus-containing flame retardant, where the thermoplastic polyurethane is a thermoplastic polyurethane based on at least one diisocyanate and on at least one polyesterdiol, and has a weight-average molar mass in the range from 90 000 g/mol to 110 000 g/mol, measured by means of GPC, where the polyesterdiol is one selected from polyesterdiols made of ϵ-caprolactone and condensates of adipic acid or sebacic acid with at least one alcohol selected from the group consisting of ethylene glycol, 1,3-propanediol, methyl-1,3-propanediol, 1,4-butanediol, 3-methyl-1,5-pentanediol, and 1,6-hexanediol, and
where the diisocyanate is an aromatic diisocyanate.
24. Composition comprising at least one thermoplastic polyurethane, at least one metal hydroxide, and at least one phosphorus-containing flame retardant, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC, where the polyesterdiol is one selected from polyesterdiols made of ϵ-caprolactone and condensates of adipic acid or sebacic acid with at least one alcohol selected from the group consisting of ethylene glycol, 1,3-propanediol, methyl-1,3-propanediol, 1,4-butanediol, 3-methyl-1,5-pentanediol, and 1,6-hexanediol,
where the diisocyanate is an aromatic diisocyanate, and
where the composition is free from inorganic oxides of magnesium, calcium, barium, strontium, boron, aluminum, and zinc.
25. Composition comprising at least one thermoplastic polyurethane, at least one metal hydroxide, and at least one phosphorus-containing flame retardant, where the thermoplastic polyurethane is a thermoplastic polyurethane based on at least one diisocyanate and on at least one polyesterdiol, and has a weight-average molar mass in the range from 90 000 g/mol to 110 000 g/mol, measured by means of GPC, where the polyesterdiol is one selected from polyesterdiols made of ϵ-caprolactone and condensates of adipic acid or sebacic acid with at least one alcohol selected from the group consisting of ethylene glycol, 1,3-propanediol, methyl-1,3-propanediol, 1,4-butanediol, 3-methyl-1,5-pentanediol, and 1,6-hexanediol,
where the diisocyanate is an aromatic diisocyanate, and
where the composition is free from inorganic oxides of magnesium, calcium, barium, strontium, boron, aluminum, and zinc.
26. Composition comprising at least one thermoplastic polyurethane, at least one metal hydroxide, and at least one phosphorus-containing flame retardant, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC,
where the polyesterdiol is one selected from polyesterdiols made of ϵ-caprolactone and condensates of adipic acid or sebacic acid with at least one alcohol selected from the group consisting of ethylene glycol, 1,3-propanediol, methyl-1,3-propanediol, 1,4-butanediol, 3-methyl-1,5-pentanediol, and 1,6-hexanediol,
where the diisocyanate is an aromatic diisocyanate, and
where the composition is free from inorganic oxides of magnesium, calcium, barium, strontium, boron, aluminum, and zinc, and
where the metal hydroxide is aluminum hydroxide.
27. Composition comprising at least one thermoplastic polyurethane, at least one metal hydroxide, and at least one phosphorus-containing flame retardant, where the thermoplastic polyurethane is a thermoplastic polyurethane based on at least one diisocyanate and on at least one polyesterdiol, and has a weight-average molar mass in the range from 90 000 g/mol to 110 000 g/mol, measured by means of GPC,
where the polyesterdiol is one selected from polyesterdiols made of ϵ-caprolactone and condensates of adipic acid or sebacic acid with at least one alcohol selected from the group consisting of ethylene glycol, 1,3-propanediol, methyl-1,3-propanediol, 1,4-butanediol, 3-methyl-1,5-pentanediol, and 1,6-hexanediol,
where the diisocyanate is an aromatic diisocyanate, and
where the composition is free from inorganic oxides of magnesium, calcium, barium, strontium, boron, aluminum, and zinc, and
where the metal hydroxide is aluminum hydroxide.
28. Use of a composition according to any of embodiments 1 to 27 for producing cable sheathing.
29. Composition comprising at least one thermoplastic polyurethane, at least one metal hydroxide, at least one phosphorus-containing flame retardant, and at least one phyllosilicate or hydrotalcite or a mixture thereof, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC.
30. Composition according to embodiment 29, where the polyesterdiol is one selected from polyesterdiols made of ϵ-caprolactone and condensates of adipic acid or sebacic acid with at least one alcohol selected from the group consisting of ethylene glycol, 1,3-propanediol, methyl-1,3-propanediol, 1,4-butanediol, 3-methyl-1,5-pentanediol, and 1,6-hexanediol.
31. Composition according to embodiment 29 or 30, where the diisocyanate is an aromatic diisocyanate.
32. Composition according to embodiment 29, where the polyesterdiol is one selected from polyesterdiols made of ϵ-caprolactone and condensates of adipic acid or sebacic acid with at least one alcohol selected from the group consisting of ethylene glycol, 1,3-propanediol, methyl-1,3-propanediol, 1,4-butanediol, 3-methyl-1,5-pentanediol, and 1,6-hexanediol, and
where the diisocyanate is an aromatic diisocyanate.
33. Composition according to any of embodiments 29 to 32, where the weight-average molar mass of the thermoplastic polyurethane is in the range from 90 000 g/mol to 110 000 g/mol, measured by means of GPC.
34. Composition according to any of embodiments 29 to 33, where the composition is free from inorganic oxides of magnesium, calcium, barium, strontium, boron, aluminum, and zinc.
35. Composition according to any of embodiments 29 to 34, where the phyllosilicate is an organically intercalated phyllosilicate, and/or the hydrotalcite is an organically intercalated hydrotalcite.

36. Composition according to any of embodiments 29 to 35, where the phyllosilicate is bentonite.
37. Composition according to any of embodiments 29 to 36, where the amount comprised of the at least one phyllosilicate or hydrotalcite or the mixture thereof is in the range from 0.5% by weight to 20% by weight, based on the entire composition.
38. Composition according to any of embodiments 29 to 35, where the phyllosilicate is bentonite, and
    where the amount comprised of the at least one phyllosilicate or hydrotalcite or the mixture thereof is in the range from 0.5% by weight to 20% by weight, based on the entire composition.
39. Composition according to any of embodiments 29 to 38, where the proportion of the total of the proportions by weight of the at least one metal hydroxide, of the at least one phosphorus-containing flame retardant, and of the at least one phyllosilicate or hydrotalcite or a mixture thereof is in the range from 10 to 80%, based on the entire composition.
40. Composition according to any of embodiments 29 to 39, where the metal hydroxide is one selected from the group consisting of aluminum hydroxide, aluminum oxide hydroxides, magnesium hydroxide, and mixtures of two or more of these hydroxides.
41. Composition according to any of embodiments 29 to 40, where the metal hydroxide is aluminum hydroxide.
42. Composition according to any of embodiments 29 to 41, where a coating surrounds the metal hydroxide at least to some extent.
43. Composition according to any of embodiments 29 to 42, where the phosphorus-containing flame retardant is one selected from the group consisting of derivatives of phosphoric acid, derivatives of phosphonic acid, derivatives of phosphinic acid, and mixtures of two or more of these derivatives.
44. Composition according to any of embodiments 29 to 43, where the phosphorus-containing flame retardant is one selected from the group consisting of resorcinol bis(diphenyl phosphate) (RDP), bisphenol A bis(diphenyl phosphate) (BDP), and diphenyl cresyl phosphate (DPC).
45. Composition according to any of embodiments 29 to 44, where the metal hydroxide is aluminum hydroxide, and
    where the phosphorus-containing flame retardant is one selected from the group consisting of resorcinol bis(diphenyl phosphate) (RDP), bisphenol A bis(diphenyl phosphate) (BDP), and diphenyl cresyl phosphate (DPC).
46. Composition according to any of embodiments 29 to 45, where the proportion of the metal hydroxide in the composition is in the range from 10 to 65%, based on the entire composition.
47. Composition according to any of embodiments 29 to 46, where the proportion of the phosphorus-containing flame retardant is in the range from 3 to 30%, based on the entire composition.
48. Composition according to any of embodiments 29 to 45, where the proportion of the metal hydroxide in the composition is in the range from 10 to 65%, based on the entire composition, and the proportion of the phosphorus-containing flame retardant is in the range from 3 to 30%, based on the entire composition.
49. Composition comprising at least one thermoplastic polyurethane, at least one metal hydroxide, at least one phosphorus-containing flame retardant, and at least one phyllosilicate or hydrotalcite or a mixture thereof, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC,
    where the polyesterdiol is one selected from polyesterdiols made of ε-caprolactone and condensates of adipic acid or sebacic acid with at least one alcohol selected from the group consisting of ethylene glycol, 1,3-propanediol, methyl-1,3-propanediol, 1,4-butanediol, 3-methyl-1,5-pentanediol, and 1,6-hexanediol, and
    where the diisocyanate is an aromatic diisocyanate.
50. Composition comprising at least one thermoplastic polyurethane, at least one metal hydroxide, at least one phosphorus-containing flame retardant, and at least one phyllosilicate or hydrotalcite or a mixture thereof, where the thermoplastic polyurethane is a thermoplastic polyurethane based on at least one diisocyanate and on at least one polyesterdiol, and has a weight-average molar mass in the range from 90 000 g/mol to 110 000 g/mol, measured by means of GPC,
    where the polyesterdiol is one selected from polyesterdiols made of ε-caprolactone and condensates of adipic acid or sebacic acid with at least one alcohol selected from the group consisting of ethylene glycol, 1,3-propanediol, methyl-1,3-propanediol, 1,4-butanediol, 3-methyl-1,5-pentanediol, and 1,6-hexanediol, and
    where the diisocyanate is an aromatic diisocyanate.
51. Composition comprising at least one thermoplastic polyurethane, at least one metal hydroxide, at least one phosphorus-containing flame retardant, and at least one phyllosilicate or hydrotalcite or a mixture thereof, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC,
    where the polyesterdiol is one selected from polyesterdiols made of ε-caprolactone and condensates of adipic acid or sebacic acid with at least one alcohol selected from the group consisting of ethylene glycol, 1,3-propanediol, methyl-1,3-propanediol, 1,4-butanediol, 3-methyl-1,5-pentanediol, and 1,6-hexanediol,
    where the diisocyanate is an aromatic diisocyanate, and
    where the composition is free from organic oxides of magnesium, calcium, barium, strontium, boron, aluminum, and zinc.
52. Composition comprising at least one thermoplastic polyurethane, at least one metal hydroxide, at least one phosphorus-containing flame retardant, and at least one phyllosilicate or hydrotalcite or a mixture thereof, where the thermoplastic polyurethane is a thermoplastic polyurethane based on at least one diisocyanate and on at least one polyesterdiol, and has a weight-average molar mass in the range from 90 000 g/mol to 110 000 g/mol, measured by means of GPC,
    where the polyesterdiol is one selected from polyesterdiols made of ε-caprolactone and condensates of adipic acid or sebacic acid with at least one alcohol selected from the group consisting of ethylene glycol, 1,3-propanediol, methyl-1,3-propanediol, 1,4-butanediol, 3-methyl-1,5-pentanediol, and 1,6-hexanediol,
    where the diisocyanate is an aromatic diisocyanate, and
    where the composition is free from inorganic oxides of magnesium, calcium, barium, strontium, boron, aluminum, and zinc.
53. Composition comprising at least one thermoplastic polyurethane, at least one metal hydroxide, at least one phosphorus-containing flame retardant, and at least one phyllosilicate or hydrotalcite or a mixture thereof, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC,
where the polyesterdiol is one selected from polyesterdiols made of ε-caprolactone and condensates of adipic acid or sebacic acid with at least one alcohol selected from the group consisting of ethylene glycol, 1,3-propanediol, methyl-1,3-propanediol, 1,4-butanediol, 3-methyl-1,5-pentanediol, and 1,6-hexanediol,
where the diisocyanate is an aromatic diisocyanate, and
where the phyllosilicate is bentonite.

54. Composition comprising at least one thermoplastic polyurethane, at least one metal hydroxide, at least one phosphorus-containing flame retardant, and at least one phyllosilicate or hydrotalcite or a mixture thereof, where the thermoplastic polyurethane is a thermoplastic polyurethane based on at least one diisocyanate and on at least one polyesterdiol, and has a weight-average molar mass in the range from 90 000 g/mol to 110 000 g/mol, measured by means of GPC,
where the polyesterdiol is one selected from polyesterdiols made of ε-caprolactone and condensates of adipic acid or sebacic acid with at least one alcohol selected from the group consisting of ethylene glycol, 1,3-propanediol, methyl-1,3-propanediol, 1,4-butanediol, 3-methyl-1,5-pentanediol, and 1,6-hexanediol,
where the diisocyanate is an aromatic diisocyanate, and
where the phyllosilicate is bentonite.

55. Composition comprising at least one thermoplastic polyurethane, at least one metal hydroxide, at least one phosphorus-containing flame retardant, and at least one phyllosilicate or hydrotalcite or a mixture thereof, where the thermoplastic polyurethane is a thermoplastic polyurethane based on at least one diisocyanate and on at least one polyesterdiol, and has a weight-average molar mass in the range from 50 000 g/mol to 200 000 g/mol, measured by means of GPC,
where the polyesterdiol is one selected from polyesterdiols made of ε-caprolactone and condensates of adipic acid or sebacic acid with at least one alcohol selected from the group consisting of ethylene glycol, 1,3-propanediol, methyl-1,3-propanediol, 1,4-butanediol, 3-methyl-1,5-pentanediol, and 1,6-hexanediol,
where the diisocyanate is an aromatic diisocyanate,
where the composition is free from inorganic oxides of magnesium, calcium, barium, strontium, boron, aluminum, and zinc, and
where the metal hydroxide is aluminum hydroxide.

56. Composition comprising at least one thermoplastic polyurethane, at least one metal hydroxide, at least one phosphorus-containing flame retardant, and at least one phyllosilicate or hydrotalcite or a mixture thereof, where the thermoplastic polyurethane is a thermoplastic polyurethane based on at least one diisocyanate and on at least one polyesterdiol, and has a weight-average molar mass in the range from 90 000 g/mol to 110 000 g/mol, measured by means of GPC,
where the polyesterdiol is one selected from polyesterdiols made of ε-caprolactone and condensates of adipic acid or sebacic acid with at least one alcohol selected from the group consisting of ethylene glycol, 1,3-propanediol, methyl-1,3-propanediol, 1,4-butanediol, 3-methyl-1,5-pentanediol, and 1,6-hexanediol,
where the diisocyanate is an aromatic diisocyanate,
where the composition is free from inorganic oxides of magnesium, calcium, barium, strontium, boron, aluminum, and zinc, and
where the metal hydroxide is aluminum hydroxide.

57. Use of a composition according to any of embodiments 29 to 56 for producing cable sheathing.

The examples below serve to illustrate the invention, but are in no way restrictive in relation to the subject matter of the present invention.

EXAMPLES

The examples reveal the improved flame retardancy of the compositions of the invention, and also the good mechanical properties and hydrolysis resistance.

1. Production Example

1.1 General Specification for Determining the Molecular Weights of Thermoplastic Urethanes The specimen is dissolved at about 1% in (dimethylformamide+0.1% of dibutylamine), and the solution is then filtered by means of a 0.45 µm PTFE filter.
The parameters set for the GPC measurement were as follows:
GPC columns: PSS gel: 100 A; 5µ; 300*8 mm
Jordi DVB gel; mixed bed; 5µ; 250*10 mm
Column temperature: 60° C.
Eluent: Dimethylformamide (multisolvent)
Flow rate: 1 mL/min
Detector: RI detector
Calibration: Conventional method, against polymethyl methacrylate (EasyCal; PSS, Mainz)

1.2 Materials

Elastollan 1185A10: TPU of Shore hardness 85A from BASF Polyurethanes GmbH, Elastogranstrasse 60, 49448 Lemförde, based on polytetrahydrofuran (PTHF) with molecular weight (Mn) of 1000 daltons, 1,4-butanediol, MDI.

Elastollan A: TPU of Shore hardness 86A from BASF Polyurethanes GmbH, Elastogranstasse 60, 49448 Lemförde, based on butanediol adipate with molecular weight (Mn) of 1000 daltons, 1,4-butanediol, MDI.

Martinal OL 104 LEO: aluminum hydroxide without coating, Martinswerk GmbH, Kölner Strasse 110, 50127 Bergheim, $Al(OH)_3$ content [%]≈99.4, particle size (laser diffraction, Cilas) [µm] D50: from 1.7 to 2.1; specific surface area (BET) [m$^2$/g]: from 3 to 5.

Nanofil 15: organically modified nano-dispersible phyllosilicate based on natural bentonites, Rockwood Clay Additives GmbH, Stadtwaldstraße 44, D-85368 Moosburg, powder, D50 average grain size, i.e. at least 50% of the particles are smaller than 40 µm.

Fyrolflex RDP: resorcinol bis(diphenyl phosphate), CAS #: 125997-21-9, Supresta Netherlands B. V., Office Park De Hoef, Hoefseweg 1, 3821 AE Amersfoort, The Netherlands.

PolyTHF®polyetherDiol 1000, BASF, a difunctional linear saturated polyetherol obtainable by polymerization of tetrahydrofuran Butanediol-1,4, BASF, purity at least 99.5%

Lupranat MET®, BASF, 4,4'-diisocyanytodiphenylmethane

Basonat® H/100, BASF, Hexamethylenediisocyanate

Elastostab® H01, BASF, polymeric carbodiimide (hydrolysis stabilizer)

1.3 Production by the Manual Casting Process

The amount defined for the polyol and for the chain extenders in the parent formulation is weighed in the tin-plated steel container and briefly blanketed with nitrogen. The container is closed with a lid and heated to about 90° C. in an oven.

Another oven is preheated to 80° C. for the heat-conditioning of the skin. The Teflon dish is placed on the hotplate, which is set to 125° C.

The calculated amount of liquid isocyanate is determined volumetrically. For this, the liquid isocyanate is weighed in a PE beaker and poured out within 10 s into a PE beaker (the volumetric determination being carried out for MDI at a temperature of about 48° C.). The resultant emptied beaker is then tared and the calculated amount of isocyanate is charged thereto. In the case of MDI, this is stored at about 48° C. in an oven.

Additions such as hydrolysis stabilizer, antioxidant, etc., where these are solid at RT, are weighed in directly.

The preheated polyol is placed on an elevating platform under the stirrer, which is at rest. The reaction vessel is then raised by the elevating platform until the stirrer blades are completely immersed in the polyol.

Before the stirrer motor is switched on, it is vital to ensure that the rotation rate controller is set at zero. The rotation rate is then slowly controlled upward in such a way as to ensure good mixing without incorporation of air.

Additives, e.g. antioxidants, are then added to the polyol.

The temperature of the reaction mixture is carefully adjusted to 80° C. by using a hot-air blower.

If necessary, prior to the addition of isocyanate, catalyst is metered into the reaction mixture by using a microliter syringe. Isocyanate is then added at 80° C., by introducing the amount previously determined volumetrically within a period of 10 s into the reaction mixture. The weight is monitored by reweighing. Deviations of +/−0.2 g from the amount in the formulation are recorded. The stop watch is started when the isocyanate is added. When the temperature reaches 110° C., the reaction mixture is poured out into the Teflon dishes, which have been preheated to 125° C.

10 min after the stopwatch has been started, the skin is removed from the hotplate and then stored at 80° C. for 15 h in an oven. The cooled skin is comminuted in the chopper mill. The granules are then dried at 110° C. for 3 h, and stored under dry conditions.

In principle, this method can also be used in a reactive extruder or in the belt process.

Formulation for Elastollan A to F:

|  | A | B | C | D | E | F |
|---|---|---|---|---|---|---|
| PTHF 1000 [g] |  |  |  |  | 5601 | 6953 |
| Butanediol adipate ester with molecular weight (Mn) of 1000 daltons [g] | 1000 |  |  |  |  |  |
| Ethylenglycol butanediol adipate ester with molecular weight (Mn) of 2000 daltons [g] |  | 6407 |  |  |  |  |

-continued

|  | A | B | C | D | E | F |
|---|---|---|---|---|---|---|
| Hexanediol butanediol adipate ester with molecular weight (Mn) of 2000 daltons [g] |  |  | 6400 | 7584 |  |  |
| Lupranat MET [g] | 535 | 2819 | 2816 |  | 3523 |  |
| Basonat H [g] |  |  |  | 1506 |  | 2217 |
| 1,4-Butanediol [g] | 101 | 717 | 714 | 640 | 766 | 736 |
| Elastostab H01 [g] | 8 | 5 | 64 | 61 |  |  |

1.4 Production of Test Specimens

Table 1 below lists compositions in which the individual starting materials have been given in parts by weight (PW). Each of the mixtures was produced by using a ZE 40 A twin-screw extruder from Berstorff with a screw length of 35 D, divided into 10 barrel sections, and was then extruded by using an Arenz single-screw extruder with a three-section screw with mixing section (screw ratio 1:3) to give foils of thickness 1.6 mm.

The test specimens for the cone measurements, measuring 200×150×5 mm, were injection-molded in an Arburg 520S with a screw diameter of 30 mm (section 1—section 3: 180° C., section 4—section 6: 185° C.). The sheets were then sawn to the size required for the cone measurement.

TABLE 1

| Parts by weight [PW] | Experiment No. |  |  |  |  |  |  |  |
|---|---|---|---|---|---|---|---|---|
|  | 1 CE | 2 Inv | 3 Inv | 4 Inv | 5 CE | 6 Inv | 7 CE | 8 Inv |
| Elastollan A [PW] |  | 51 |  |  |  | 51 |  |  |
| Elastollan B [PW] |  |  |  | 51 |  |  |  |  |
| Elastollan C [PW] |  |  | 51 |  |  |  |  |  |
| Elastollan D [PW] |  |  |  |  |  |  |  | 51 |
| Elastollan E [PW] | 51 |  |  |  | 51 |  |  |  |
| Elastollan F [PW] |  |  |  |  |  |  | 51 |  |
| Fyrolflex RDP [PW] | 10 | 10 | 10 | 10 | 11 | 11 | 10 | 10 |
| Nanofil 15 [PW] | 5 | 5 | 5 | 5 |  |  | 5 | 5 |
| Martinal OL 104 LEO [PW] | 34 | 34 | 34 | 34 | 38 | 38 | 34 | 34 |

CE: Comparative example, Inv: example according to the invention

2. Example

Flame Retardancy

In order to evaluate flame retardancy, a test specimen of thickness 5 mm is tested horizontally with a radiation intensity of 35 kW/m$^2$ in a cone calorimeter in accordance with ISO 5660 part 1 (2002-12) and part 2. Table 2 gives the results.

TABLE 2

| Properties | Specification | Unit | Exp. No. |  |  |  |  |  |  |  |
|---|---|---|---|---|---|---|---|---|---|---|
|  |  |  | 1 | 2 | 3 | 4 | 5 | 6 | 7 | 8 |
| Time to ignition | ISO 5660 part 1 | [s] | 70 | 92 | 77 | 76 | 91 | 97 | 41 | 79 |

TABLE 2-continued

| Properties | Specification | Unit | Exp. No. | | | | | | | |
|---|---|---|---|---|---|---|---|---|---|---|
| | | | 1 | 2 | 3 | 4 | 5 | 6 | 7 | 8 |
| THR, total heat release | | [MJ/m$^2$] | 129 | 104 | 105 | 109 | 120 | 103 | 140 | 123 |
| PHRR, peak of heat release rate | | [kW/m$^2$] | 150 | 128 | 136 | 127 | 497 | 369 | 234 | 156 |
| MAHRE | | [kW/m$^2$] | 116 | 96 | 101 | 87 | 259 | 190 | 169 | 107 |
| Residue | | [%] | 26 | 34 | 32 | 32 | 20 | 29 | 13 | 29 |
| Total smoke generation for defined area | | [m$^2$/m$^2$] | 4296 | 2607 | 2255 | 2181 | 5335 | 3169 | 3647 | 1796 |
| PHRR/tig | | | 2.14 | 1.39 | 1.77 | 1.67 | 5.46 | 3.80 | 5.71 | 1.97 |

According to Petrella (Petrella R. V., The assessment of full scale fire hazards from cone calorimeter data, *Journal of Fire Science*, 12 (1994), p. 14), the quotient calculated from peak of heat release rate and time to ignition is a measure of the contribution that the material concerned makes to a rapidly growing fire. The total heat release is moreover a measure of the contribution that the material concerned makes to a fire of long duration.

The results of the cone calorimeter measurements for mixtures 1 and 2 were depicted graphically in a Petrella plot, shown in FIG. 1. The tendency of the material to contribute to a rapidly growing fire (PHRR/$t_{ig}^{-1}$/kWm$^{-2}$s$^{-1}$) has been plotted on the x-axis here. The tendency of the material to contribute to a fire of long duration (THR/MJm$^{-2}$) has been plotted on the y-axis. Materials with improved flame retardancy values here have minimized x and y values. The results have been collated in Table 2 and in the Petrella plot.

The materials of the invention have higher flame retardancy. The mixtures of the invention exhibit lower smoke density.

3. Example

Mechanical Properties

Mixtures 1, 5, and 7 are comparative examples, using a thermoplastic polyurethane based on polyether polyol.

Mixtures 2 to 4, 6 an 8 are of the invention and reveals that the compositions of the invention have good mechanical properties. Properties measured on the appropriate test specimens were tensile strength and tensile strain at break (in accordance with DIN 53504) and Shore A hardness (in accordance with DIN 53505).

TABLE 3

| Properties | | | Exp. No. | | | | | | | |
|---|---|---|---|---|---|---|---|---|---|---|
| | | | 1 | 2 | 3 | 4 | 5 | 6 | 7 | 8 |
| Tensile strength | DIN 53504 | [MPa] | 25 | 24 | 21 | 20 | 29 | 19 | 8 | 12 |
| Tensile strain at break | | [%] | 580 | 610 | 670 | 610 | 680 | 490 | 360 | 540 |
| Shore A hardness | DIN 53505 | [MPa] | 86 | 88 | 87 | 87 | 86 | 87 | 88 | 88 |

4. Example

Aging Resistance

In order to evaluate oxidative aging resistance, a test specimen is aged at 113° C. for 7 days or 121° C. for 7 days respectively in a convection oven, and then mechanical parameters are determined. Table 4 below (storage at 113° C.) and table 5 (storage at 121° C.) collate the results.

TABLE 4

| Properties | Specification | Unit | Exp. No. | | |
|---|---|---|---|---|---|
| | | | 1 | 2 | 4 |
| Tensile strength | DIN 53504 | [MPa] | 26 | 24 | 20 |
| Tensile strain at break | | [%] | 660 | 610 | 610 |
| Tensile strength | DIN 53504 | [MPa] | 16 | 20 | 16 |
| Change in tensile strength | | [%] | −38 | −17 | −20 |
| Tensile strain at break | DIN 53504 | [%] | 650 | 650 | 670 |
| Change in tensile strain at break | | [%] | 14 | 7 | 10 |

TABLE 5

| Properties | Specification | Unit | Exp. No. | | |
|---|---|---|---|---|---|
| | | | 1 | 2 | 4 |
| Tensile strength | DIN 53504 | [MPa] | 26 | 24 | 20 |
| Tensile strain at break | | [%] | 660 | 610 | 610 |
| Tensile strength | DIN 53504 | [MPa] | 16 | 20 | 16 |
| Change in tensile strength | | [%] | −62 | −33 | −40 |
| Tensile strain at break | DIN 53504 | [%] | 430 | 560 | 640 |

TABLE 5-continued

| | | | Exp. No. | | |
|---|---|---|---|---|---|
| Properties | Specification | Unit | 1 | 2 | 4 |
| Change in tensile strain at break | | [%] | −35 | −8 | 5 |

Mixtures 2 and 4 are of the invention, and reveal that the use of mixtures comprising TPU based on polyesterols significantly reduces strength loss due to heat treatment, i.e. markedly improves oxidative aging resistance.

Figure 1:
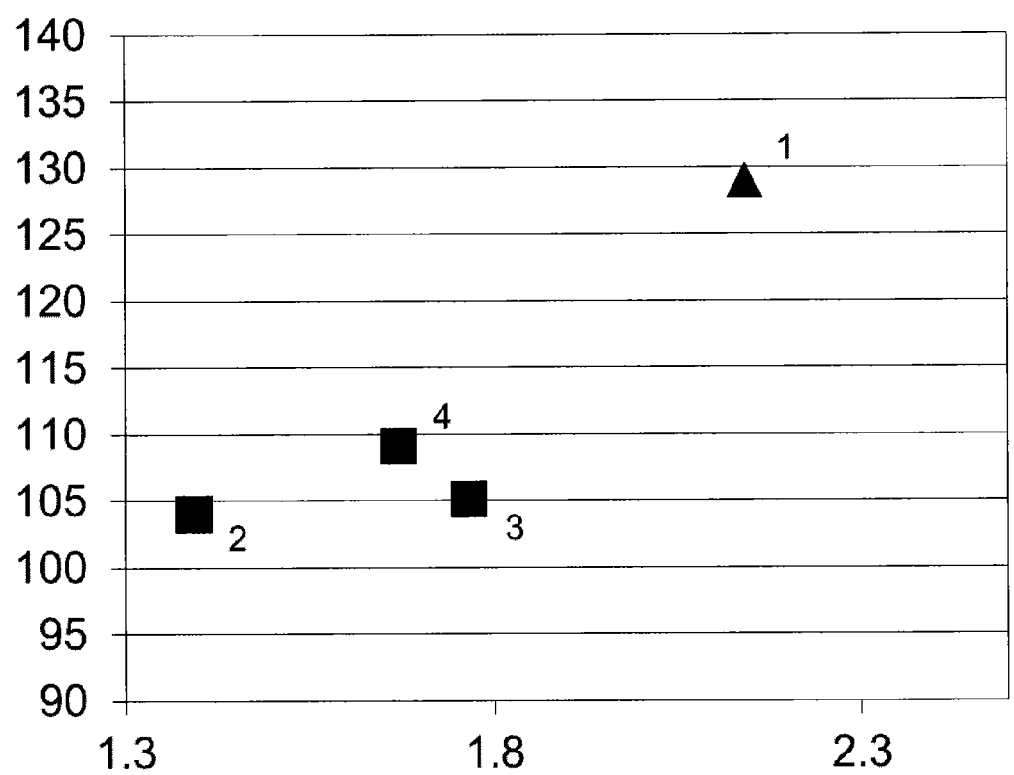
FIG. 1 shows the results of the cone calorimeter measurements for mixtures 1 and 2 to 4 in a Petrella plot. The tendency of the material to contribute to a rapidly growing fire (PHRR/$t_{ig}^{-1}$/kWm$^{-2}$s$^{-1}$) has been plotted on the x-axis here. The tendency of the material to contribute to a fire of long duration (THR/MJm$^{-2}$) has been plotted on the y-axis. According to Petrella (Petrella R. V., The assessment of full scale fire hazards from cone calorimeter data, *Journal of Fire Science*, 12 (1994), p. 14), the quotient calculated from peak of heat release rate and time to ignition is a measure of the contribution that the material concerned makes to a rapidly growing fire. The total heat release is moreover a measure of the contribution that the material concerned makes to a fire of long duration. Materials with improved flame retardancy values have minimized x and y values. Materials 2 to 4 (symbolized by way of the solid square) have better properties than comparative material 1 (symbolized by the solid triangle).
Figure 2:
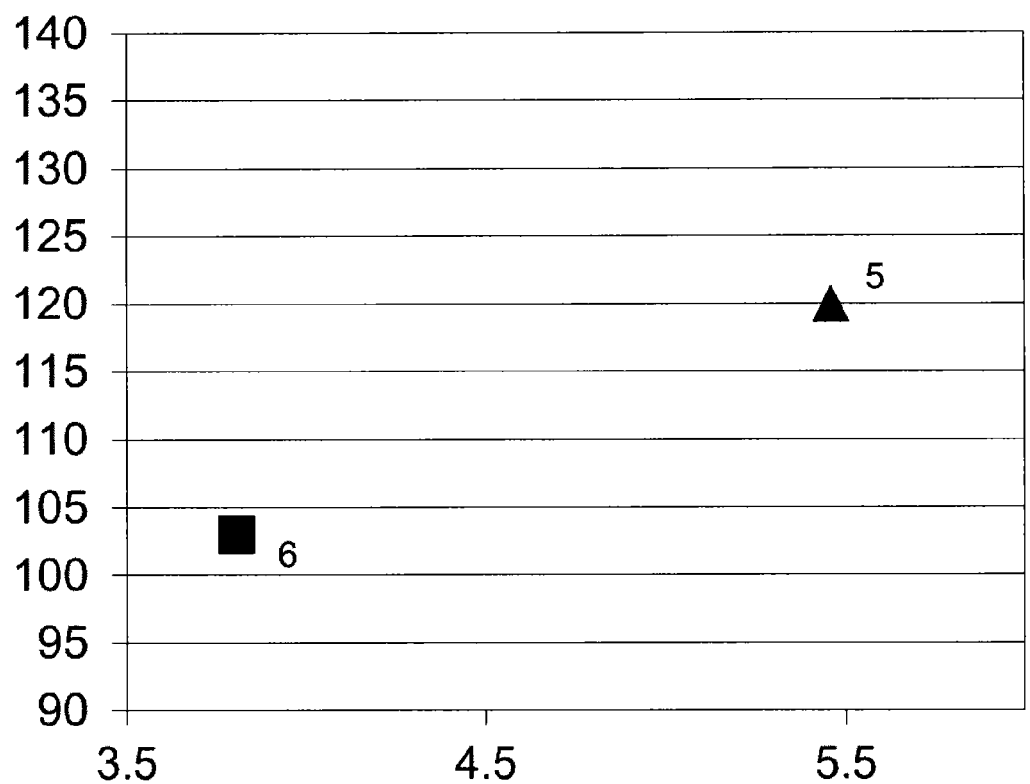
FIG. 2 shows the results of the cone calorimeter measurements for mixtures 5 and 6 in a Petrella plot. The tendency of the material to contribute to a rapidly growing fire (PHRR/$t_{ig}^{-1}$/kWm$^{-2}$s$^{-1}$) has been plotted on the x-axis here. The tendency of the material to contribute to a fire of long duration (THR/MJm$^{-2}$) has been plotted on the y-axis. According to Petrella (Petrella R. V., The assessment of full scale fire hazards from cone calorimeter data, *Journal of Fire Science*, 12 (1994), p. 14), the quotient calculated from peak of heat release rate and time to ignition is a measure of the contribution that the material concerned makes to a rapidly growing fire. The total heat release is moreover a measure of the contribution that the material concerned makes to a fire of long duration. Materials with improved flame retardancy values have minimized x and y values. Material 6 (symbolized by way of the solid square) has better properties than comparative material 5 (symbolized by the solid triangle).
Figure 3:
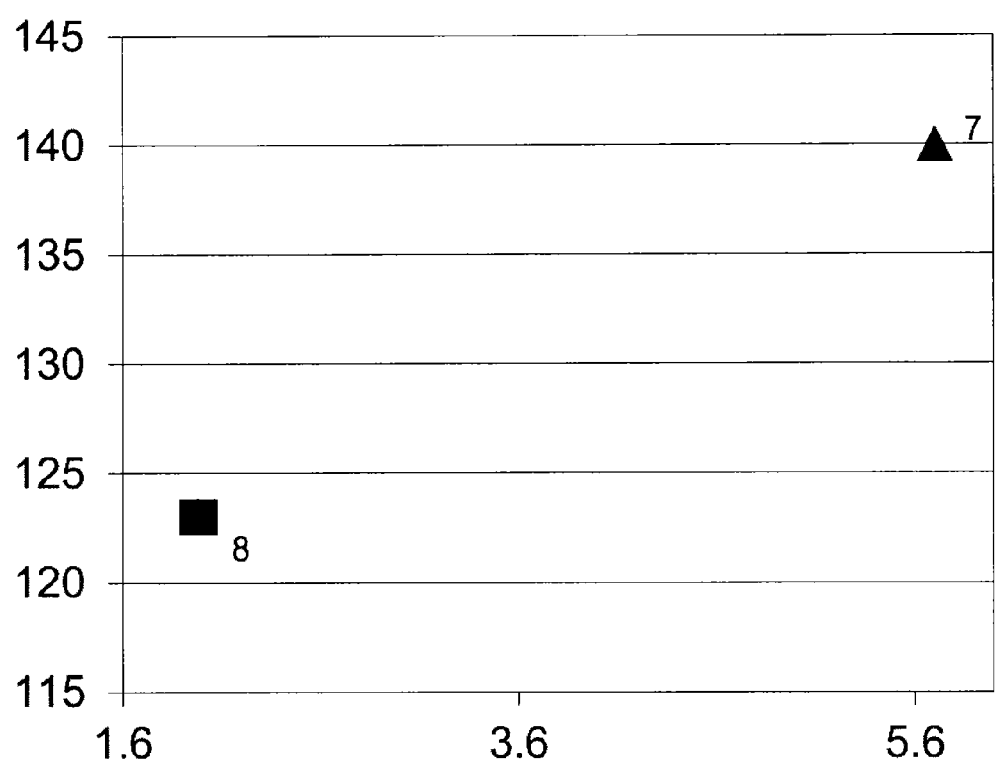
FIG. 3 shows the results of the cone calorimeter measurements for mixtures 7 and 8 in a Petrella plot. The tendency of the material to contribute to a rapidly growing fire (PHRR/$t_{ig}^{-1}$/kWm$^{-2}$s$^{-1}$) has been plotted on the x-axis here. The tendency of the material to contribute to a fire of long duration (THR/MJm$^{-2}$) has been plotted on the y-axis. According to Petrella (Petrella R. V., The assessment of full scale fire hazards from cone calorimeter data, *Journal of Fire Science*, 12 (1994), p. 14), the quotient calculated from peak of heat release rate and time to ignition is a measure of the contribution that the material concerned makes to a rapidly growing fire. The total heat release is moreover a measure of the contribution that the material concerned makes to a fire of long duration. Materials with improved flame retardancy values have minimized x and y values. Material 8 (symbolized by way of the solid square) has better properties than comparative material 7 (symbolized by the solid triangle).

The invention claimed is:

1. A composition, comprising:
   a thermoplastic polyurethane,
   a metal hydroxide,
   a phosphorus-containing flame retardant, and
   at least one of an organically intercalated phyllosilicate and an organically intercalated hydrotalcite,
   wherein
   the thermoplastic polyurethane is a thermoplastic polyurethane based on at least one aromatic diisocyanate and on at least one polyesterdiol,
   the at least one polyesterdiol is one selected from the group consisting of a polyesterdiol made of ε-caprolactone and a condensate of adipic or sebacic acid with at least one alcohol selected from the group consisting of ethylene glycol, 1,3-propanediol, methyl-1,3-propanediol, 1,4-butanediol, 3-methyl-1,5-pentanediol, and 1,6-hexanediol,
   and a weight-average molar mass of the thermoplastic polyurethane is from 50 000 g/mol to 200 000 g/mol, measured by GPC, and
   the composition is free from inorganic oxides of magnesium, calcium, barium, strontium, boron, aluminum, and zinc.

2. The composition according to claim 1, wherein a content of the at least one of the organically intercalated phyllosilicate and the organically intercalated hydrotalcite is from 0.5% by weight to 20% by weight, based on the entire weight of the composition.

3. The composition according to claim 1, wherein the composition comprises a total amount by weight of
   the metal hydroxide,
   the phosphorus-containing flame retardant, and
   the at least one of the organically intercalated phyllosilicate and the organically intercalated hydrotalcite of from 10 to 80% by weight, based on the entire weight of the composition.

4. The composition according to claim 1, wherein the weight-average molar mass of the thermoplastic polyurethane is of from 90 000 g/mol to 110 000 g/mol, measured by GPC.

5. The composition according to claim 1, wherein the metal hydroxide comprises one selected from the group consisting of an aluminum hydroxide, an aluminum oxide hydroxide, magnesium hydroxide, and any mixture thereof.

6. The composition according to claim 1, wherein the metal hydroxide is aluminum hydroxide.

7. The composition according to claim 1, wherein the metal hydroxide comprises at least a partial coating.

8. The composition according to claim 1, wherein the phosphorus-containing flame retardant is one selected from the group consisting of a derivative of phosphoric acid, a derivative of phosphonic acid, a derivative of phosphinic acid, and any mixture thereof.

9. The composition according to claim 1, wherein the phosphorus-containing flame retardant is one selected from the group consisting of resorcinol bis(diphenyl phosphate) (RDP), bisphenol A bis(diphenyl phosphate) (BDP), and diphenyl cresyl phosphate (DPC).

10. The composition according to claim 1, wherein a content of the metal hydroxide is from 10 to 65% by weight, based on the entire composition.

11. The composition according to claim 1, wherein a content of the phosphorus-containing flame retardant is from 3 to 30% by weight, based on the entire composition.

12. The composition according to claim 1, wherein the content of the metal hydroxide is from 10 to 65% by weight, and the content of the phosphorus-containing flame retardant is from 3 to 30% by weight, based on the entire composition.

13. A method for producing cable sheathing, the method comprising:
employing the composition according to claim 1 in production of the cable sheathing.

* * * * *